United States Patent
Shinar et al.

(10) Patent No.: US 10,685,517 B2
(45) Date of Patent: *Jun. 16, 2020

(54) REMOTE CONTROL FOR ACTUATING GARAGE DOORS AND OTHER BARRIERS, AND METHOD AND SYSTEM OF USING SAME

(71) Applicant: OLIBRA LLC, Cresskill, NJ (US)

(72) Inventors: Zohar Shinar, Demarest, NJ (US); Christopher Andrew Merck, Vernon, NJ (US); Guy Zeltzer, Closter, NJ (US)

(73) Assignee: OLIBRA LLC, Cresskill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,134

(22) Filed: Dec. 19, 2019

(65) Prior Publication Data
US 2020/0143614 A1    May 7, 2020

Related U.S. Application Data

(63) Continuation of application No. 16/001,958, filed on Jun. 7, 2018, now Pat. No. 10,553,057.

(60) Provisional application No. 62/517,919, filed on Jun. 11, 2017.

(51) Int. Cl.
G07C 9/00        (2020.01)
G07C 9/27        (2020.01)
H04L 29/08       (2006.01)

(52) U.S. Cl.
CPC .......... *G07C 9/00309* (2013.01); *H04L 67/12* (2013.01); *G07C 9/27* (2020.01); *G07C 2009/00492* (2013.01); *G07C 2009/00769* (2013.01); *G07C 2009/00928* (2013.01); *G07C 2209/10* (2013.01); *H04L 67/10* (2013.01)

(58) Field of Classification Search
None
See application file for complete search history.

(56) References Cited

U.S. PATENT DOCUMENTS 10,553,057 B2 *  2/2020  Shinar ..................... H04L 67/12

* cited by examiner

*Primary Examiner* — Daniell L Negron
(74) *Attorney, Agent, or Firm* — Eitan Mehulal Sadot (57) ABSTRACT

Remote control for actuating garage doors and other barriers, and method and system of using same. A base unit includes: a wireless receiver, to wirelessly receive from an electronic device an incoming wireless signal indicating a command to actuate a garage door; a wireless signal constructor, to dynamically construct an outgoing wireless signal which comprises a rolling code; a wireless transmitter, to transmit the outgoing wireless signal to a wireless receiver of a motor unit that is operably associated with the garage door. A wireless signal constructor dynamically constructs the outgoing wireless signal without having access to a secret seed value that is accessible to the motor unit. A local storage unit stores a data-set of rolling codes that are associated with the motor unit; and the outgoing wireless signal is dynamically constructed based on a next-available rolling code obtained from the local storage unit of the base unit.

20 Claims, 1 Drawing Sheet

REMOTE CONTROL FOR ACTUATING GARAGE DOORS AND OTHER BARRIERS, AND METHOD AND SYSTEM OF USING SAME

CROSS-REFERENCE TO RELATED APPLICATIONS

This patent application is a Continuation of U.S. Ser. No. 16/001,958, filed on Jun. 7, 2018, which is hereby incorporated by reference in its entirety; which claims benefit and priority from U.S. 62/517,919, filed on Jun. 11, 2017, which is hereby incorporated by reference in its entirety.

FIELD

Some embodiments relate to the field of electronic devices.

BACKGROUND

Millions of people worldwide utilize electronic devices for various purposes on a daily basis. For example, people utilize a laptop computer, a desktop computer, a smartphone, a tablet, and other electronic devices, in order to send and receive electronic mail (e-mail), to browse the Internet, to play games, to consume audio/video and digital content, to engage in Instant Messaging (IM) and video conferences, to perform online banking transactions and online shopping, and to do various other tasks.

SUMMARY

The present invention comprises devices, systems, and methods for controlling, actuating, moving, opening and/or closing of garage doors, gates, fences, and/or other barriers.

For example, a base unit may include: (i) a wireless receiver, to wirelessly receive from an electronic device an incoming wireless signal indicating a command to actuate a garage door; (ii) a wireless signal constructor, to dynamically construct an outgoing wireless signal which comprises a rolling code; and (iii) a wireless transmitter, to transmit the outgoing wireless signal to a wireless receiver of a motor unit that is operably associated with the garage door. The wireless signal constructor dynamically constructs the outgoing wireless signal without having access to a secret seed value that is accessible to the motor unit. A local storage unit stores a data-set of rolling codes that are associated with the motor unit; and the outgoing wireless signal is dynamically constructed based on a next-available rolling code obtained from the local storage unit of the base unit. The system allows an end-user to indirectly control the garage door (or other fence or moving barrier) via the user's smartphone or tablet or similar electronic device, which sends wireless commands to the base unit, directly or indirectly through an intermediary device.

DETAILED DESCRIPTION OF SOME DEMONSTRATIVE EMBODIMENTS

The term "garage door" as used herein may comprise, for example, other suitable types of barriers, blockade members, movable gate, movable door, movable fence, a garage door able to open upwardly and able to close downwardly, a garage door able to swing or swivel or rotate on axis, a garage door able to be pulled by chains or belts, a movable barricade, or other types of closing/opening members or mechanisms. Similarly, the term "garage door system" may comprise systems that include such other types of barriers.

Figure 1:
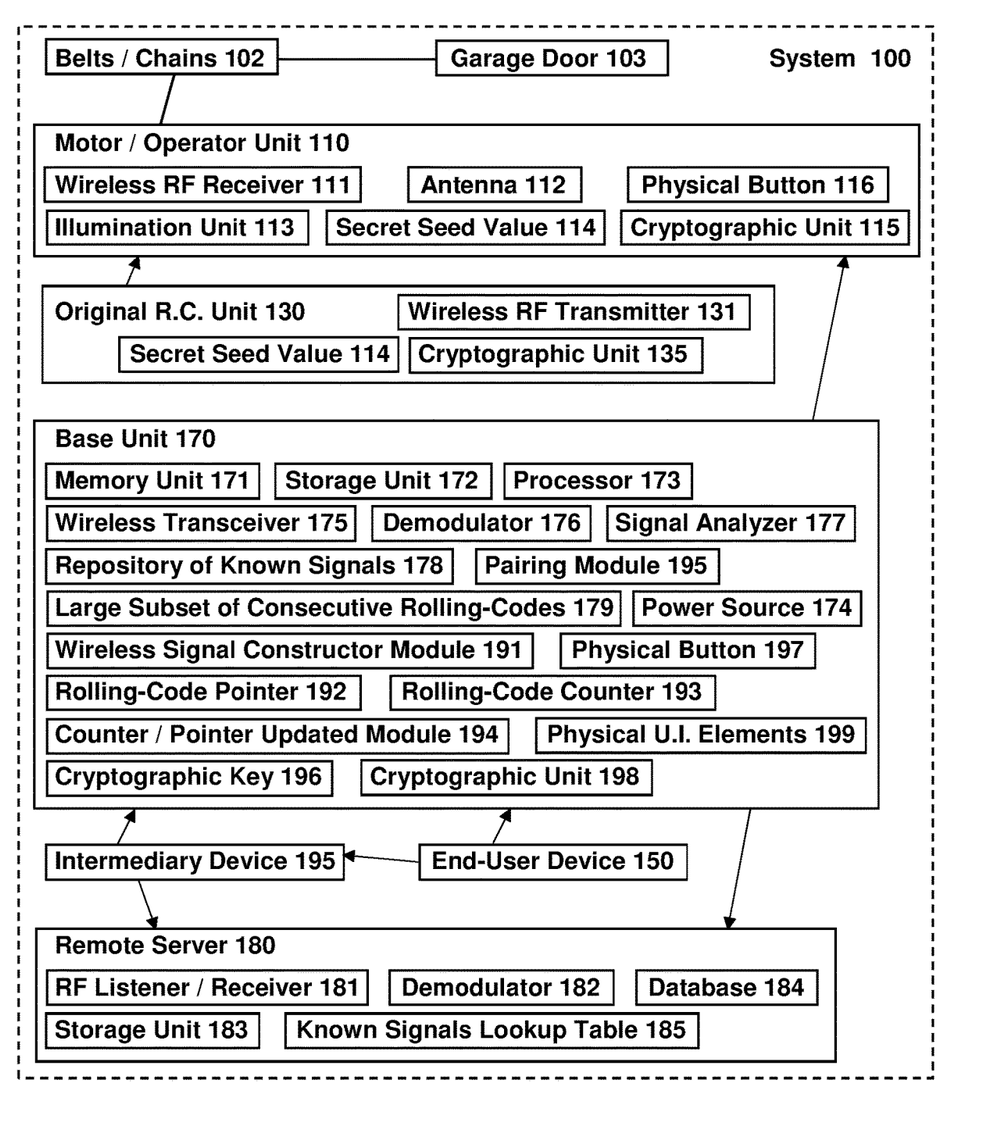
FIG. 1 is a schematic illustration of a system, in accordance with some demonstrative embodiments of the present invention.

Reference is made to FIG. 1, which is a schematic illustration of a garage door system 100, in accordance with some demonstrative embodiments of the present invention. Garage door system 100 may comprise, for example: a motor unit or an operator unit, denoted as motor/operator unit 110, typically affixed to (or mounted under) the ceiling of a garage; operable via belts and/or chains 102 to pull or to push or to move a garage door 103 (or other movable barrier). The motor/operator unit 110 comprises a wireless Radio Frequency (RF) receiver 111, and optionally a wireless RF antenna 112, to receive from a wireless RF transmitter 131 of a proprietary or "original" wireless Remote Control (RC) unit 130, an RF signal carrying a payload that indicates a command to activate or actuate or trigger the motor/operator 110, such that the garage door 103 would close if it is currently open, or such that the garage door 103 would open if it is currently closed, or to toggle the state of the garage door 103 between open and close or vice versa, or activate any other function of the garage door 103 or the garage door system 100 (e.g., turn on/turn off an illumination unit 112 of the motor/operator unit 110 of the garage door system 100).

In some embodiments, the original RC unit 130 on the one hand, and the wireless RF receiver 111 of the motor/operator unit 110 on the other hand, may utilize a rolling code mechanism or a hopping code mechanism; such that each button-press of the original RC unit 130, causes the original RC unit 130 to generate and to transmit a new code that is different from the most-recently-used code. Each new code is generated based on a Secret Seed Value 114 (or a seed word, or multiple seed values, or multiple seed words), optionally using a particular cryptographic function performed by a cryptographic unit; such that, for example, both the motor/operator unit 110 and the original RC unit store the same Secret Seed Value 114, and have cryptographic units (115, 135) that utilize the same cryptographic function (e.g., a deterministic function) on that same secret seed value 114 in order to generate rolling code(s).

The unique Secret Seed Value 114 is known only to the original RC unit 130 and to the corresponding motor/operator unit 110, due to a one-time Pairing Process (or device serialization process; or system serialization process) that is performed during a new installation of a garage door system. In the pairing process, the user pushes a physical button 116 on the motor/operator unit 110; then, the user pushes a "transmit' button of the original RC unit 130, which causes the wireless RF transmitter 131 of the original RC unit 130 to transmit a wireless RF signal that is received by the wireless RF receiver 111 of the motor/operator unit 110; which in turn utilizes that incoming wireless RF signal to pair with the particular original RC unit 130 that was pressed, such that these two particular units (the motor/operator unit 110, and the original RC unit 130) are paired with each other, and such that the original RC unit 130 will not trigger opening of a garage door of a neighbor, and such that the wireless RF receiver 111 of the motor/operator unit 110 will not open the garage door 103 based on a wireless signal received from another RC unit (e.g., a neighbor's RC unit); and such that the motor/operator unit 110 will respond to wireless RF signals that are transmitted by this particular original RC unit 130 that was paired with this particular motor/operator unit 110.

In accordance with the present invention, system 100 further comprises an end-user device 150, and a base unit 170. The end-user device 150 may be a portable electronic device, a smartphone or tablet or smart-watch (or other device, e.g., a smart RC unit, a smart television RC unit, a portable gaming device, a portable "smart home" unit or RC unit, or the like), and is configured to be in wireless communication (directly, or indirectly via an intermediate device or router or relay unit) with the base unit 170 that is typically connected to a power outlet in a house (e.g., attached to the garage or near the garage) or in a garage. The base unit 170 comprises a memory unit 171, a storage unit 172, a processor 173, a power source (e.g., a connection to a wall-based power source, and/or a battery), and a wireless transceiver 175.

The end-user device 150 may communicate with the base unit 170, directly, e.g., via a local network or a WLAN or an ad hoc wireless network, or via a direct local wireless communication link; and/or indirectly, e.g., via a remote server, via the Internet, via TCP/IP communications, via a cloud-based system, or the like; and/or via an intermediary service or an optional intermediary device 195, e.g., via an Amazon® Alexa® or Amazon® Echo® device or other home automation device or smart-home hub unit which is able to capture spoken audio, upload it to a remote cloud computing server, which then converts the speech to text and processes the text and outputs a digital indication of a user command or a user query.

The base unit 170 may operate to duplicate the functionality of the original RC unit 130 of the garage door system 100, without necessarily knowing (or relying on) the Secret Seed Value 114 that is known only to the motor/operator unit 110 and the original RC unit 130; and/or without necessarily knowing (or relying on) the particular cryptographic function or deterministic function that is utilized (e.g., by a microchip or controller in the original RC unit 130 and/or in the motor/operator unit 110) to dynamically generate rolling codes.

In some embodiments, for example, a remote server 180 of a remote laboratory may perform a code-gathering process, in which an original RC unit of a garage door system is pressed or is actuated a large number of times via an automated process; for example, a robot or a robotic arm presses or "clicks" on the button of the original RC unit 130, for example 100,000 times or one million times, at short time intervals (e.g., every 0.1 seconds). For example, one million clicks on the button of the original RC unit 130, at time intervals of 0.1 seconds, would take approximately 100,000 seconds, which is approximately 1,666 minutes, or approximately 28 hours.

Each one of those one million clicks on the button of the original RC unit 130, causes the original RC unit 130 to generate and to transmit a wireless signal that comprises a new, different, hopping code. A dedicated RF listener/receiver unit 181, which is not part of a garage door system, listens to and captures and records those one million wireless signals generated at the remote laboratory. For example, each such incoming RF wireless signal is demodulated via a demodulator 182, and its payload is stored in a storage unit 183 or database 184, in exactly the same order as captured, one hopping code after another. The result of such 28-hour session of code-gathering process is a database 184 comprising one million code-words or hopping-codes or rolling-codes, that were generated by a particular original RC unit 130 of a garage door system. Such database 184 is stored at the remote server 180 in that laboratory, or in a "cloud computing" database or server or repository.

Upon a new installation or activation of the base unit 170, the base unit 170 wirelessly contacts the remote server 180 of the laboratory. The base unit 170 asks the user (e.g., the owner of the garage), via the end-user device 150 (which communicates wirelessly with the base unit 170), which model or type of garage door system the user has; for example, is it a "purple button" garage door system, or a "red button" garage door system, or a "yellow button" garage door system, or a "Vendor X, Model Y" garage door system, or the like. The user selects or indicates the particular type or model, via his end-user device 150.

Alternatively, the base unit 170 may learn the type of RC unit 130 (or the type of garage door system 100) based on capturing and analysis of one or more wireless transmissions from the original RC unit 130; or based on capturing (e.g., receiving and recording) a wireless signal or wireless sample from that original RC unit 130 and analyzing it; such as, receiving it via the wireless transceiver 175; demodulating it via a demodulator 176; analyzing it via a signal analyzer 177, identifying the payload, header, preamble, and/or other signal components or message components, and comparing the analyzed or extracted data or meta-data to pre-defined or pre-known components of signals of various types of original RC units or of various types of garage door systems, which may be pre-stored in a repository of known signals 178 (which may be part of the base unit 170; or, which may be stored remotely, such as at the remote server 180, and may be accessible to the base unit 170 via such remote server 180).

The base unit 170 sends to the remote server 180, an indication of the type or model of the particular garage door system being used in this particular garage; for example, a message indicating that it is a "yellow button" garage door system. The indication may be sent over an Internet based communication link, via HTTP, via HTTPS, via FTP, and/or via TCP/IP communication; and/or via wired and/or wireless communication link(s) and/or network(s) that allow the base unit 170 to communicate with the remote server 180.

The remote server 180 receives that indication; and utilizes a pre-defined Known Signals Lookup Table 185 to determine or to obtain the fixed (non-hopping, non-rolling, non-changing) portion of the payload that is utilized by that type or model of garage door system. For demonstrative purposes, the Known Signals Lookup Table 185 may indicate that all the garage door systems having a "yellow button", utilize a wireless communication signal that carries a payload having a fixed portion and then a rolling-code portion, wherein the fixed portion is, for example, a series of bits corresponding to the string "YellowButton", and wherein the non-fixed portion is a rolling code that spans 32 bits.

It is noted that the different "colors" or types of codes (or, of signals) may also be distinguished or differentiated (e.g., locally by the base unit 170, and/or remotely by the remote server 180), based on analysis of one or more signal characteristics and/or payload characteristics, for example, data rate, modulation, preamble, encoding type, frequency, number of bits, identification of pre-defined strings of bits or sequences of bits within the payload, identification of pre-defined sequence of bits that indicate a Header or a Prefix or a Suffix of particular type, and/or identification of an encryption scheme; and thus, some embodiments of the present invention may operate even if there does not exist an identifiable "fixed" portion to the code.

In some embodiments, the system of the present invention may capture (receive, record, and store), and demodulate and analyze (e.g., in the base unit 170, and/or in the remote server 180), a sample wireless signal from the original RC unit 130, in order to determine which RC unit 130 is in fact utilized or which garage door system 100 is actually operational in this particular house or venue. In some embodiments, optionally, the system of the present invention may query the user a single question, initiated by the remote server 180 and/or by the base unit 170, and presented to the user via the end-user device 150; such as "what color is the button on your garage door motor unit", and based on the response (e.g., yellow, purple, red) that the user conveys through the end-user device 150, the system may determine the set of parameters to utilize (e.g., frequency range, frequency value, encoding type, encryption type, or the like), taking into account the pre-stored data in the Known Signals Lookup Table 185.

The remote server 180 sends a wireless message to the base unit 170, indicating to the base unit 170 what is (or, what should be) the fixed portion of the payload that is utilized by that particular garage door system; such as, in the above example, indicating to the base unit 170 that this particular garage door system utilizes a wireless signal, that is transmitted at a particular frequency, and starts with a fixed component that reads "YellowButton", and then continues with a non-fixed component (e.g., a hopping code) having a fixed length of (for example) 32 bits.

Then, the remote server 180 sends to the base unit 170, a large set of data-items: for example, a set of 50,000 consecutive rolling-codes (or hopping-codes) that were recorded from the one-million-clicks that were performed in the laboratory using that type of original RC unit 130. In some embodiments, the entire dataset is sent to the base unit 170, for example, the entire data-set of one million rolling-codes. In other embodiments, only a subset of the data is sent to the base unit 170, for example, only 50,000 consecutive rolling-codes out of those one million rolling-codes. In some embodiments, optionally, the entire data-set may be sent to the base unit 170 in chunks or in portions; such as, 40,000 consecutive rolling-codes per day (or per hour), over 25 days (or over 25 hours).

In some embodiments, a first subset of rolling codes (e.g., the first 50,000 consecutive rolling-codes) is sent by the remote server 180 to Base Unit A (e.g., owned by user Adam); whereas a second, different, subset of rolling codes (e.g., the next 50,000 consecutive rolling-codes) is sent by the remote server 180 to Base Unit B (e.g., owned by user Bob). Furthermore, the remote server 180 may use a location-based algorithm when assigning or allocating or sending or distributing blocks or chunks of consecutive rolling-codes, in order to minimize the probability of a collision between hopping codes provided to neighboring base units; optionally utilizing location-based data or geo-spatial data, obtained from the base unit 170 and/or from the end-user device 150 (e.g., smartphone or tablet), as one of them or both of them may optionally comprise a Global Positioning System (GPS) unit or other location-identifying unit or module (e.g., based on cellular triangulation; based on Wi-Fi network identification; based on Service Set Identifier (SSID) of a wireless network, or the like).

The base unit 170 receives the large subset of rolling-codes, and stores it within its local storage unit 172 or memory unit 171, as a Large Subset of Consecutive Rolling-Codes 179.

Later, the user utilizes his end-user device 150 (e.g., smartphone, tablet, smart-watch, or the like) to command the end-user device 150 to transmit a wireless command to actuate the motor/operator unit 110 of his garage door. The wireless command is transmitted from the end-user device 150, directly or indirectly, to the base unit 170; for example, over a local Wi-Fi communication link, IEEE 802.11 communication link, Bluetooth communication, Zigbee communication, over a TCP/IP communication link; or via an intermediary device 195 such as Amazon® Alexa® or other home automation device or other smart home hub unit or a local wireless hub or wireless router or wireless Access Point (AP) or wireless router, or the like.

The base unit 170 accesses the locally-stored Large Subset of Rolling Codes 179, and utilizes the first rolling-code on that list, to generate and to transmit an outgoing wireless RF signal that carries a payload, wherein the payload comprises: (i) the fixed (non-hopping, non-changing) portion that was received one time from the remote server 180, and (ii) the first locally-stored rolling-code from the dataset of locally-stored rolling codes. For example, a Wireless Signal Constructor Module 191 of the base unit 170 may dynamically construct such wireless signal for wireless transmission, from the already-received fixed portion and from the next-available rolling code.

The outgoing wireless RF signal is transmitted by the wireless transceiver 175 of the base unit 170. The wireless RF signal is received by the wireless RF receiver of the motor/operator unit 110 of the garage door system 100, and triggers the motor/operator unit 110 to actuate (e.g., to toggle the position of) the garage door 103. Both the motor/operator unit 110, and the base unit 170, may mark the particular rolling-code that was transmitted, as an "already utilized" rolling-code. For example, the base unit 170 may utilize a Rolling-Code Pointer 192 to point to the most-recently-used rolling-code in the dataset of consecutive rolling codes; or, to point to the next-available rolling-code in the dataset of consecutive rolling codes; or may utilize a Rolling-Code Counter 193 that is incremented upon each such rolling-code utilization. The counter or pointer, utilized by the base unit 170, is incremented or updated by a Counter/Pointer Updated Module 194 of the base unit 170, upon utilization of a rolling code. Similarly, a similar pointer or indicator or counter may be used by the motor/operator unit 110 of that garage door system 110.

In some embodiments, a one-time pairing process may be performed via a Pairing Module 195 of the base unit 170, to enable pairing between (i) the particular base unit 170, and (ii) the particular motor/operator unit 110; similarly to the manner in which the motor/operator unit 110 may be paired with a new original RC unit 130. For example, the physical button 116 is pressed in the motor/operator unit 110; and the base unit 170 is commanded (e.g., by the user, through the end-user device 150; or by pushing an optional physical button 197 in the base unit 170 itself) to wirelessly transmit a wireless signal comprising the first-available (or the next available) rolling-rolling code that it stores locally in the base unit 170. The motor/operator unit 110 analyzes the received wireless signal and its payload, in order to pair with the particular base unit 170 being used, such that both that base unit 170 and that motor/operator unit 110 will be synchronized with each other and will utilize the same series of consecutive rolling-codes; and/or such that the motor/operator unit 110 "thinks" or "believes" that the base unit 170 is a proprietary or original RC unit; and/or such that the motor/operator unit 110 would become "locked" to respond to the base unit 170 that was paired with it, and not to a neighboring base unit of a neighboring house that was not paired with it.

In some embodiments, upon receiving a user command (e.g., conveyed wirelessly via the end-user device 150) to actuate (e.g., to toggle) the garage door 103, the base unit 170 may construct and wirelessly transmit the appropriate wireless RF signal, with the same rolling-code, optionally transmitted by the base unit 170 multiple times (e.g., in series, or in parallel) but at different frequencies out of a particular set of pre-defined frequencies; for example, 310 MHz, 315 MHz, 344 MHz, and 390 MHz; in order to ensure reception of the wireless RF signal by the wireless RF receiver 111 of the motor/operator unit 110, which may utilize one of several, common, pre-defined frequencies. Such multiple transmissions of the same signal, over several "candidate frequencies" that are typically utilized by garage door systems, may obviate the need to particularly determine the exact frequency that is actually utilized by the particular motor/operator unit 110 in that particular house or venue.

In some embodiments, the base unit 170 may eventually run out of pre-recorded rolling codes, once it is utilized 50,000 times in the above example. For example, the user may open and close its garage door 10 times per day, every day; and the data-set of 50,000 rolling codes that was stored in the Large Subset of Consecutive Rolling-Codes 179 would suffice for 5,000 days, which is over 13 years of such daily usage. In such scenario, or if the base unit 170 detects that only N rolling-codes remain not-yet-used (e.g., N being equal to 500 or 700 or other suitable pre-defined threshold value), the base unit 170 may autonomously contact the remote server 180 of the laboratory and may request a new or additional subset of rolling-codes; and may download or obtain or wirelessly receive from the remote server 180 a new, different, subset of 50,000 other, consecutive, rolling-codes that would replace or would augment (or be appended to) the previous, already-utilized (or, about to be already-utilized) subset of rolling-codes. This mechanism may increase the security of the database of rolling codes, as no user (or, no single base unit 170) has access to the full database of rolling codes; and request limiting may be used to prevent abuse, such as illegitimate attempts to read out the entire database through successive requests. In some embodiments, the data-set of rolling codes may be distributed to users in smaller chunks or smaller portions; for example, each chunk or portion having 1,000 or 7,000 rolling-codes, rather than 50,000 rolling-codes per chunk in the previous example.

In some embodiments, optionally, a new pairing process may be performed now between the motor/operator unit 110, and the base unit 170 that has just downloaded or received a new subset of consecutive rolling codes; and the end-user device 150 alerts the user to manually perform the new pairing process. In other embodiments, once the new batch or dataset of consecutive rolling-codes is delivered to the base unit 170, no re-pairing is needed; since the second batch of 50,000 consecutively recorded rolling codes, may be a direct consecutive continuation in sequence after the first (e.g., the previous) batch of 50,000 rolling codes that are about to be used up.

In some embodiments, the set of 50,000 rolling-codes that is stored locally within the base unit 170, may optionally be encrypted by a cryptographic unit 198 of the base unit 170 with a unique encryption key or cryptographic key 196 (e.g., hard-coded into the base unit 170, or securely stored in a secure storage thereof); such that an intruder or attacker that may somehow copy the local data from within the base unit 170, may only be able to copy encrypted data that is useless or meaningless without actual knowledge of the cryptographic key 196; thereby protecting the rolling-codes themselves from being copied or utilized by an attacker or by a competitor. In some embodiments, the set of 50,000 rolling-codes, that are transmitted from the remote server 180 to the base unit 170, may be transmitted or transported over a secure link or an encrypted channel or a secure communication channel (e.g., over HTTPS, or other secure communication link or secure communication channel), and/or may be transmitted in an encrypted format; in order to prevent an eavesdropper from capturing (or copying, or altering) the subset of rolling-codes as plaintext in transit. The base unit 170 may optionally use a Trusted Computing Module or a Trusted Execution Environment (TEE) or a Secure Execution Environment (SEE), or a suitable MCU, having a decryption unit or its cryptographic unit 198, to decrypt the rolling codes (or, to decrypt one single rolling-code immediately prior to its utilization or immediately as it is requested to be utilized), thereby further compartmentalizing the data and increasing security.

In some embodiments, from a security point-of-view, the communication between the base unit 170 and the wireless RF receiver 111 of the motor/operator unit 110, is not less secure from the RF communication between the original RC unit 130 and the motor/operator unit 110; or, it utilizes one or more mechanisms that meet or exceed the security considerations that govern the RF communication between the original RC unit 130 and the motor/operator unit 110.

In some embodiments, the motor/operator unit 110 may be triggered to actuate the garage door 103, if the incoming wireless RF signal carries a payload that comprises the rolling-code that is the next-to-be-utilized rolling code according to the motor/operator, or that is one of the next 256 or the next 512 (or the next N) rolling-codes that are next-to-be-utilized; for example, in order to enable the motor/operator unit 110 to be actuated, if an original RC unit 130 and/or the end-user device 150 were clicked while not within the reception range of the motor/operator unit 110. In some embodiments, the motor/operator 110 may respond to wireless RF signals from the base unit 170 and/or from the original RC unit 130 which may still function as before. In other embodiments, the original RC unit 130 may even be discarded and not utilized any more, and may be entirely replaced by the base unit 170 which in turn is in communication with the end-user device 150.

In some embodiments, a single base unit 170 may be associated with, and may receive wireless signals or commands from, two or more end-user devices 150; for example, a single garage door 103, may be controlled via a single motor/operator unit 110, which receives wireless RF signals from a single base unit 170, which in turn may be associated with: the smartphone of user Adam, and/or the smartphone of his wife Barbara, and/or the tablet of their son Charles, and/or the smart-watch of their daughter Diana. In some embodiments, each one of such end-user device(s) need not necessarily be in proximity to the base unit 170, or in (or near) the garage or the house; but rather, such end-user device(s) 150 may optionally communicate with the base unit via a TCP/IP communication link or via the Internet, even if they are located remotely or away; for example, thereby enabling a user to open his garage door 103 while the user is located at work, in order to allow a guest or a visitor to enter his garage (e.g., to pick up an item from the garage; to drop off an item in the garage; to pass into the house through the garage).

Optionally, the remote opening and/or closing of the garage door 103 by a non-attending user (who is far away from the house or the garage) may be performed as part of a delivery system in which a courier delivers a package (e.g., purchased merchandise from an online vendor) directly into the garage of a customer, who opens and closes the garage door 103 remotely via his end-user device in response to a message (e.g., SMS message, email message, phone message) that indicates to the user that the courier is at the venue and is ready to drop-off the package into the garage.

In some embodiments, the base unit 170 may optionally include one or more physical buttons or other User Interface (UI) elements, such as Physical UI Elements 199; or may have one or more on-screen GUI elements; and particularly, a UI element (e.g., a physical button, or an on-screen button) that allows a user to manually command the base unit 170 to wirelessly command the motor/operator unit 110 to actuate the garage door 103. This may allow a user, for example, to utilize the base unit 170 for the main purpose that it provides, namely for remotely opening or remotely closing the garage door, even if the user's end-user device 150 (e.g., his smartphone, tablet, or the like) is not nearby or is not available (e.g., user lost his smartphone; the tablet broke down or malfunctions; the smartphone ran out of battery power).

In accordance with some embodiments of the present invention, original or proprietary rolling-codes based RC units operate by transmitting upon every trigger a different secret code (rolling code) that is modulated in an RF signal. The secret code (or, Secret Seed Value) is known only to the Receiver (e.g., the motor/operator unit 110) and the Transmitter (e.g., the original RC unit 130), and is shared when the two are manufactured or when they are paired during a new system installation. The system of the present invention may demodulate the RF signal, and then may control the motor/operator unit 110 using its same RF receiver 111 without knowing the secret code or the secret Seed Value 114 or the cryptographic algorithm utilized for dynamically generating rolling codes.

The Applicants have realized that many original RC units of garage door systems, belong to the same family of RC units. As a result, the system of the present invention may identify such different families or types of RC units in advance and may collect many wireless RF signals of each family, which contains the rolling codes; thereby recording by a remote server 180 in a laboratory hundreds of thousands, or millions, of such consecutive RF signals per each family (or type, or model, or brand) of RC unit.

The recording of such millions of consecutive rolling codes is performed in sequence at a dedicated laboratory or facility, away from the actual garage door 103 that would later be controlled by the user via his end-user device 150 and via his base unit 170. Once the base unit 170 is introduced to (and paired with) the wireless RF receiver 111 of the particular garage door system 100, the base unit 170 is accepted by the motor/operator unit 110 as if it was a new, valid, RC unit or as a new, valid, RF transmitter, and a fresh counting and following of consecutive rolling-codes begins and is performed on the receiver side (namely, at the motor/operator unit 110). Since the recording of the rolling-codes is performed in sequence, the receiving side (the motor/operator unit 110) starts to follow/count the rolling-codes based on the first rolling-code that the base unit 170 started to utilize.

In some embodiments, optionally, the base unit 170 may be implemented as a single base unit 170 that is able to remotely control the garage door 103 (via its motor/operator unit 110) as well as other appliances or devices; for example, a ceiling fan, an air conditioner, an air conditioning unit, an HVAC unit, a smoke detector, an alarm system, or the like.

For example, the processor 173 of the base unit 170 may execute code, and/or the wireless transceiver 175 of the base unit may transmit wireless signals, that may cause such other devices or appliances to turn on, turn off, modify their operational settings, or otherwise be controlled via a single base unit 170. Optionally, the base unit 170 may store representations of a set of wireless signals that correspond to a set of wireless commands that control each such device; for example, a set of commands to wirelessly control a ceiling fan, another set of commands to wirelessly control an air conditioner, or the like. Optionally, the base unit 170 may store parameters and functions that enable it to dynamically generate or construct wireless commands, that control known device or even future devices, based on a "script" that indicates how to dynamically construct and transmit the wireless command for such device(s), e.g., which frequency to use, which modulation to use, which fixed and/or non-fixed portion(s) to construct and include in the wireless signal or message, or the like; and optionally, the base unit 170 may periodically receive updates from the remote server 180, with representations of new wireless commands (e.g., for new devices or appliances, or for already-controlled devices or appliances), and/or with "scripts" that instruct the base unit 170 how to dynamically construct and transmit wireless commands to such devices and appliances.

In some implementations, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, an apparatus comprises: a wireless receiver, to wirelessly receive from an electronic device an incoming wireless signal indicating a command to actuate a garage door; a wireless signal constructor, to dynamically construct an outgoing wireless signal which comprises a rolling code; a wireless transmitter, to transmit said outgoing wireless signal to a wireless receiver of a motor unit that is operably associated with said garage door.

In some embodiments, said wireless signal constructor is to dynamically construct said outgoing wireless signal without having access to a secret seed value that is accessible to said motor unit.

In some embodiments, the apparatus further comprises: a local storage unit to store a data-set of rolling codes that are associated with said motor unit; wherein said wireless signal constructor is to dynamically construct said outgoing wireless signal by including in said outgoing wireless signal a next-available rolling code obtained from said local storage unit of the apparatus.

In some embodiments, the wireless receiver is to further receive, from a remote server, the data-set of rolling codes that are associated with said motor unit.

In some embodiments, the wireless receiver is to receive, from said electronic device, a wireless communication signal indicating a user-indication of a property of said motor unit; wherein the wireless transmitter is to wirelessly transmit, to a remote server, said user-indication of the property of said motor unit; wherein the wireless receiver is to receive, from said remote server, the data-set of rolling codes that are associated with said motor unit.

In some embodiments, the wireless receiver is to further receive, from a remote server, the data-set of rolling codes that are associated with said motor unit; wherein the data-set of rolling codes, that is received from the remote server, is only a partial subset of an entire dataset of rolling codes that can actuate said motor unit.

In some embodiments, the wireless receiver is to further receive, from a remote server, via a secure communication channel, an encrypted version of the data-set of rolling codes that are associated with said motor unit; wherein the apparatus comprises a cryptographic unit to dynamically decrypt only one rolling code of said data-set, upon receiving a user command to actuate the garage door.

In some embodiments, the wireless receiver is to capture and record a sample wireless signal that is transmitted by a proprietary remote control unit that is associated with said motor unit; wherein the apparatus comprises: a demodulator to demodulate the sample wireless signal; a signal analyzer to analyze a demodulated version of said sample wireless signal, and to determine a type of said motor unit; wherein the wireless transmitter is to wirelessly transmit, to a remote server, an indication of said type of said motor unit; wherein the wireless receiver is to receive, from said remote server, the data-set of rolling codes that are associated with said motor unit.

In some embodiments, the wireless receiver is to capture and record a sample wireless signal that is transmitted by a proprietary remote control unit that is associated with said motor unit; wherein the wireless transmitter is to upload to a remote server, at least a portion of a copy of said sample wireless signal, to enable said remote server to demodulate and analyze said sample wireless signal and to identify a type of said motor unit; wherein the wireless receiver is to receive, from said remote server, the data-set of rolling codes that are associated with said motor unit.

In some embodiments, the apparatus further comprises: a User Interface (UI) element to receive a direct manual input from a user; wherein said wireless signal constructor and said wireless transmitter are also triggered to operate based on said direct manual input from the user.

In some embodiments, the apparatus further comprises: a pairing module to perform a wireless pairing process between said apparatus and said motor unit; wherein actuation of the pairing module triggers the wireless transmitter to transmit a wireless communication signal having a rolling code, which enables the motor unit to pair with said apparatus.

In some embodiments, the wireless receiver of the apparatus is to wirelessly receive said incoming wireless signal directly from said electronic device via a local Wi-Fi communication network in which said apparatus and said electronic device participate.

In some embodiments, the wireless receiver of the apparatus is to wirelessly receive said incoming wireless signal directly from said electronic device via a local Wi-Fi router which is in direct Wi-Fi communication with each one of said apparatus and said electronic device.

In some embodiments, the wireless receiver of the apparatus is to wirelessly receive said incoming wireless signal indirectly from said electronic device via a home automation unit; wherein said incoming wireless signal is transmitted wirelessly from said electronic device to said home automation unit which in turn generates and sends a different wireless signal to said base unit to trigger actuation of said garage door. In some embodiments, the wireless receiver of the apparatus is to wirelessly receive said incoming wireless signal indirectly from said electronic device via a home automation unit and via a cloud computing system; wherein said incoming wireless signal is transmitted wirelessly from said electronic device to said home automation unit, which in turn sends another, different, signal to said cloud computing system, which in turn sends yet another, different, signal to said base unit to trigger actuation of said garage door.

In some embodiments, the wireless receiver of the apparatus is to wirelessly receive said incoming wireless signal from said electronic device which is a smartphone or a tablet.

In some embodiments, a system comprises a base unit and a remote server. The base unit comprises: a wireless receiver, to wirelessly receive from an electronic device an incoming wireless signal indicating a command to actuate a garage door; a wireless signal constructor, to dynamically construct an outgoing wireless signal which comprises a rolling code; a wireless transmitter, to transmit said outgoing wireless signal to a wireless receiver of a motor unit that is operably associated with said garage door. The remote server comprises: a storage unit, to store a data-set of rolling codes that, when included in a wireless signal, cause said motor unit to actuate said garage door; a wireless transceiver to transmit to said base unit a partial subset of said data-set of rolling codes.

In some embodiments, the remoter server generates said data-set of rolling codes by: (I) actuating a proprietary remote control unit of said garage door, and (II) capturing a wireless signal transmitted by said proprietary remote control unit, and (III) extracting a rolling code from said wireless signal; and (IV) repeating operations (I) through (III) at least 100 times (or, at least 500 times; or, at least 1,000 times; or, at least N times, wherein N is a natural number).

In some embodiments, the wireless transceiver of the remote server is configured or adapted or programmed: (I) to transmit to said base unit located at a first venue, a first partial subset of said data-set of rolling codes, and (II) to transmit to another base unit located at a second venue, a second partial subset of said data-set of rolling codes; wherein the first partial subset comprises rolling codes that are not comprised in the second partial subset; wherein the second partial subset comprises rolling codes that are not comprised in the first partial subset.

In some embodiments, the base unit further comprises a local storage unit to store said partial subset of rolling codes; wherein the wireless signal constructor of the base unit is to dynamically construct said outgoing wireless signal by including in said outgoing wireless signal a next-available rolling code obtained from said local storage unit of the base unit.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. An apparatus for remotely controlling a motor unit of a garage door, the apparatus comprising:

a wireless receiver, to wirelessly receive from an electronic device an incoming wireless signal indicating a command to actuate a garage door;
wherein said wireless receiver is to further receive, from a remote server, an encrypted representation of a partial data-set of rolling codes that are associated with said motor unit;
wherein the partial data-set of rolling codes is only a partial subset of an entire dataset of rolling codes that can actuate said motor unit;
a wireless signal constructor, to dynamically construct an outgoing wireless signal which comprises a rolling code;
a wireless transmitter, to transmit said outgoing wireless signal to a wireless receiver of said motor unit that is operably associated with said garage door.

2. The apparatus of claim 1,
wherein the wireless receiver is to receive from said remote server, said encrypted representation of the partial data-set of rolling codes, via a secure communication channel.

3. The apparatus of claim 1,
wherein the apparatus comprises a cryptographic unit to dynamically decrypt only one rolling code of said partial data-set of rolling codes, upon receiving a user command to actuate the motor unit of the garage door.

4. The apparatus of claim 1,
wherein said wireless signal constructor is to dynamically construct said outgoing wireless signal without having access to a secret seed value that is accessible to said motor unit.

5. The apparatus of claim 1, further comprising:
a local storage unit to store locally within said apparatus an encrypted version of said partial data-set of rolling codes that are associated with said motor unit;
wherein a cryptographic unit of said apparatus performs decryption of a rolling code upon receiving a user command to actuate the motor unit of the garage door.

6. The apparatus of claim 1, further comprising:
a cryptographic unit to decrypt at least a portion of said partial data-set of rolling codes;
a local storage unit to store locally within said apparatus a decrypted version of at least one decrypted version of a rolling code that is associated with said motor unit.

7. The apparatus of claim 1,
wherein said wireless signal constructor is to dynamically construct said outgoing wireless signal by including in said outgoing wireless signal a next-available rolling code obtained from a local storage unit of said apparatus.

8. The apparatus of claim 1, further comprising:
a cryptographic unit to dynamically decrypt two or more rolling codes of said data-set, upon receiving a user command to actuate the garage door;
wherein said two or more rolling codes are stored locally in a storage unit of said apparatus, and are utilized for two or more subsequent actuations of said motor unit of said garage door.

9. The apparatus of claim 1, further comprising:
a User Interface (UI) element to receive a direct manual input from a user;
wherein said wireless signal constructor and said wireless transmitter are triggered to operate based on said direct manual input from the user.

10. The apparatus of claim 1, further comprising:
a pairing module to perform a wireless pairing process between said apparatus and said motor unit;
wherein actuation of the pairing module triggers the wireless transmitter to transmit a wireless communication signal having a rolling code, which enables the motor unit to pair with said apparatus.

11. The apparatus of claim 1,
wherein the wireless receiver of the apparatus is to wirelessly receive said incoming wireless signal directly from said electronic device via a local Wi-Fi communication network in which said apparatus and said electronic device participate.

12. The apparatus of claim 1,
wherein the wireless receiver of the apparatus is to wirelessly receive said incoming wireless signal directly from said electronic device via a local Wi-Fi router which is in direct Wi-Fi communication with each one of said apparatus and said electronic device.

13. The apparatus of claim 1,
wherein the wireless receiver of the apparatus is to wirelessly receive said incoming wireless signal indirectly from said electronic device via a home automation unit,
wherein said incoming wireless signal is transmitted wirelessly from said electronic device to said home automation unit, which in turn generates and sends a different wireless signal to said wireless receiver of said apparatus to trigger remote actuation of said motor unit of the garage door.

14. The apparatus of claim 1,
wherein the wireless receiver of the apparatus is to wirelessly receive said incoming wireless signal indirectly from said electronic device via a home automation unit and via a cloud computing system,
wherein said incoming wireless signal is transmitted wirelessly from said electronic device to said home automation unit, which in turn sends another, different, signal to said cloud computing system, which in turn sends yet another, different, signal to the wireless receiver of said apparatus to trigger remote actuation of said motor unit of the garage door.

15. The apparatus of claim 1,
wherein the wireless receiver of the apparatus is to wirelessly receive said incoming wireless signal from said electronic device which is a smartphone or a tablet.

16. A system comprising:
(a) a base unit comprising:
a wireless receiver, to wirelessly receive from an electronic device an incoming wireless signal indicating a command to actuate a garage door;
a wireless signal constructor, to dynamically construct an outgoing wireless signal which comprises a rolling code;
a wireless transmitter, to transmit said outgoing wireless signal to a wireless receiver of a motor unit that is operably associated with said garage door;
(b) a remote server comprising:
a storage unit, to store a data-set of rolling codes that, when included in a wireless signal, cause said motor unit to actuate said garage door;
a wireless transceiver to transmit to said base unit at least one of: (i) a single rolling code from said data-set of rolling codes, (ii) a partial subset of said data-set of rolling codes, (iii) an encrypted version of said single rolling code, (iv) an encrypted version of said partial subset of said data-set of rolling codes.

17. The system of claim 16,
wherein the remote server generates said data-set of rolling codes by:

(I) actuating a proprietary remote control unit of said garage door, (II) capturing a wireless signal transmitted by said proprietary remote control unit, (III) extracting a rolling code from said wireless signal, and (IV) repeating operations (I) through (III) at least 10 times.

18. The system of claim 16,
wherein the wireless transceiver of the remote server is
(I) to transmit to said base unit located at a first venue, a first partial subset of said data-set of rolling codes, and
(II) to transmit to another base unit located at a second venue, a second partial subset of said data-set of rolling codes,
wherein the first partial subset comprises rolling codes that are not comprised in the second partial subset,
wherein the second partial subset comprises rolling codes that are not comprised in the first partial subset.

19. The system of claim 16,
wherein the base unit further comprises a local storage unit to store said partial subset of rolling codes;
wherein the wireless signal constructor of the base unit is to dynamically construct said outgoing wireless signal by including in said outgoing wireless signal a next-available rolling code obtained from said local storage unit of the base unit.

20. The system of claim 16,
wherein the base unit further comprises a local storage unit to store an encrypted version of said partial subset of rolling codes;
wherein the wireless signal constructor of the base unit is to dynamically construct said outgoing wireless signal by including in said outgoing wireless signal a next-available rolling code obtained from said local storage unit of the base unit.

\* \* \* \* \*